United States Patent [19]

Kakuk et al.

[11] Patent Number: 5,432,088
[45] Date of Patent: Jul. 11, 1995

[54] METHOD AND APPARATUS FOR AEROBIC COMPOSTING

[75] Inventors: Jay J. Kakuk, Plymouth; Robert W. Beachy, Saint Paul, both of Minn.

[73] Assignee: The Toro Company, Bloomington, Minn.

[21] Appl. No.: 188,659

[22] Filed: Jan. 26, 1994

Related U.S. Application Data

[63] Continuation of Ser. No. 856,617, Mar. 24, 1992, abandoned.

[51] Int. Cl.$^6$ ............ C12M 1/02; C05F 9/02
[52] U.S. Cl. .................. 435/316; 422/184; 71/9
[58] Field of Search ............ 435/287, 299, 305, 315, 435/316; 71/9; 422/184; 210/256

[56] References Cited

U.S. PATENT DOCUMENTS

| | | | |
|---|---|---|---|
| 197,406 | 11/1877 | Reinecke | 47/83 |
| D. 263,365 | 3/1982 | Arato | D34/1 |
| D. 269,046 | 5/1983 | Faul | D34/4 |
| D. 294,993 | 3/1988 | Faul | D34/1 |
| 1,782,675 | 11/1930 | Bayley | 52/192 |
| 3,240,343 | 3/1966 | Werner | 210/256 |
| 3,293,798 | 12/1966 | Johnson, Sr. | 47/34.12 |
| 3,890,129 | 6/1975 | Chester | 71/9 |
| 3,942,769 | 3/1976 | Whiteside et al. | 259/81 R |
| 4,105,412 | 8/1978 | Petzinger | 23/259.1 |
| 4,108,609 | 8/1978 | Petzinger | 23/259.1 |
| 4,125,394 | 11/1978 | Wilson | 71/9 |
| 4,352,888 | 10/1982 | Tisbo et al. | 435/287 |
| 4,683,674 | 8/1987 | Faul | 47/83 |
| 4,687,645 | 8/1987 | Harvey | 422/184 |
| 4,797,397 | 1/1989 | Pinder | 435/313 |

OTHER PUBLICATIONS

Langenbach, 1990 Fall Catalog, (No Month) p. 5.
Flowtron Advertisement, Flowtron Outdoor Products (Date Unknown) "Modular Compost Bin".
Photocopy of pp. 51, 55, 79, 83, 89 and 211-239 of book entitled *The Complete Book of Compositing*, copyright 1960, by J. I. Rodale. (No Month).
Rubbermaid Incorporated brochure, copyright 1991, entitled "Rubbermaid® Composter." (No Month).
Reuter, Inc. leaflet entitled "Reuter's Composting Bind," date unknown.
Leaflet apparently published by The Natursoil Company, date unknown.
Barclay Recycling Inc. leaflet entitled "Recycling Beings At Home," copyright 1991. (No month).
Document entitled "Composters At A Glance," dated Apr., 1988.
Article entitled "Composting and Mulching: A Guide To Managing Organic Yard Wastes," date unknown.
Article from the Apr./May 1991 edition of Yard & Garden magazine.

*Primary Examiner*—Ferris Lander
*Attorney, Agent, or Firm*—R. Lawrence Buckley

[57] ABSTRACT

A compost bin (20) including a plurality of substantially horizontal aeration/mixing slots (42). Slots (42), preferably "L-shaped," permit mixing and aeration of the composting material. A mixing tool, e.g., garden fork, can be inserted substantially vertically into the mixing-/aeration slots (42), and pivoted to a substantially horizontal position to achieve thorough mixing of the compost material. Compost bin (20) also preferably includes a cover (26) having one or more rain collection ramps (74) which collect rainwater and divert it to one or more rain slots (76) and into the interior of compost bin (20).

6 Claims, 5 Drawing Sheets

METHOD AND APPARATUS FOR AEROBIC COMPOSTING

This is a continuation of application Ser. No. 07/856,617, filed Mar. 24, 1992, which was abandoned upon the filing hereof.

FIELD OF THE INVENTION

This invention generally relates to methods and apparatus for composting organic waste material. More particularly, the invention relates to a system for the aerobic composting of organic waste material on a domestic scale.

BACKGROUND OF THE INVENTION

Composting, as is well known, is a controlled method of decomposition which transforms organic material (animal or vegetable) into a rich, brown earth-like substance called humus. While organic material can be composted either aerobically (with air) or anaerobically (without air), the present invention specifically relates to the aerobic composting of organic materials such as grass clippings, leaves and twigs. Of course, virtually any organic material, including newspaper, kitchen wastes, wood scraps, etc., can be composted but this discussion will focus primarily on aerobic composting of lawn and garden waste materials.

Composting is a self-decaying hot fermenting process, and certain conditions must exist in order for this process to be most efficient. For example, the microorganisms (bacteria and fungi, primarily) which decompose the organic material require balanced amounts of oxygen, water and nitrogen; and also work best within a certain temperature range and, it is believed, in the absence of sunlight. Since the present invention is directed to providing the ideal environment for the aerobic composting of lawn and garden waste, each of these conditions is discussed in greater detail below.

As noted above, composting microbes need oxygen to operate most efficiently. Ambient air is the normal source of oxygen for aerobic composting. The compost pile or heap must have enough ambient air to meet the oxygen requirements of the microbes; and enough ambient air to carry off waste gases generated as a by-product of the aerobic decomposition process.

Aerobic composting works best if the organic material is damp but not too wet. If there is too much water in the compost heap, the microbes will in effect be drowned and only slower anaerobic composting will take place. On the other hand, if the compost heap is too dry the microbes will not thrive. Thus, the oxygen and water requirements are somewhat at odds: there must be enough ambient air to meet the microbes' oxygen needs, but too much air can excessively dry the compost pile.

Nitrogen, another necessary ingredient of the aerobic composting "recipe," is provided through the organic material itself (e.g., grass or other nitrogen-rich material) or through the addition of a compost inoculant typically in the nature of a standard lawn and garden fertilizer. For grass composting, an inoculant may not be needed; whereas a 20-5-5 or 18-0-0 NPK fertilizer is preferable for the composting of leaves.

As to the temperature of the compost heap, a preferred temperature range is about 120° F. to 160° F. at the center of the pile. Aerobic composting is accelerated if the pile is insulated such that heat energy produced during the exothermic decaying process is, for the most part, contained within the compost heap.

Finally, the aerobic composting process seems to be accelerated in the dark; it is believed that some of the microbes are less effective when exposed to light.

Aerobic composting has been used for hundreds if not thousands of years. However, many of the composting methods and devices which have been tried over the years do not provide ideal aerobic composting conditions, as described above, or are unacceptable for other reasons. For example, simple compost piles having no wall structures to contain the composting material allow excessive heat loss from the pile; permit organic material (e.g., leaves) to blow away; subject the compost pile to excessive water in the event of a heavy rain, or insufficient water when the compost heap is exposed to drafts; potentially expose the pile to excessive sunlight; and are unsightly. While a simple uncontained compost pile is certainly cost effective and easy to mix, such a technique clearly has several disadvantages.

Presumably in an effort to make their compost piles less unsightly and to reduce water evaporation, some people have used pits or crude above-ground structures (e.g., rock walls) for containing their compost piles. One problem with this technique is that such pits or structures tend to excessively inhibit the flow of air to the compost pile. Further, the compost pile can still receive either too much or too little water. Also, it can be extremely difficult to mix the composting materials in a pit or crude structure (e.g., rock walls). Thus, even though compost pits or crude above-ground walled composters are cheap and easy to implement, generally they are not particularly effective.

Another common composting apparatus is constructed of chicken wire or the like. Typically a short section of the wire mesh is configured to form a cylindrical bin, with removable clips at the seam. Wire mesh composters are advantageous in that they are very inexpensive and they help prevent the composting materials from simply blowing away. However, the composting process can be inhibited because the organic material is either too wet (if exposed to a heavy rain) or too dry (if windy), and the material is exposed to sunlight which, it is believed, can reduce the effectiveness of some microbes. Also, particularly in high density urban or suburban areas, wire mesh compost bins can be objectionable from the standpoint of their appearance.

It's also difficult to adequately mix the contents of a wire mesh composter. The composter can, of course, be disassembled (typically by removing the clips at the seam) to allow mixing of the compost pile with a pitchfork or the like, but this is clearly a time consuming chore: the enclosure is disassembled; the pile mixed and turned over; and then the enclosure is reassembled. Alternatively, the contents of the composter can be mixed from the top, without disassembling the bin. The primary problem with the top mixing approach is that it is awkward. One has to lean over the top rim of the wire mesh enclosure and attempt to turn the pile with a shovel, pitchfork, or special tool. Since the wire mesh is very flimsy it is not possible to lean on or leverage off of the top rim of the enclosure.

To address some of the problems with unframed wire mesh composters of the type discussed above, various types of framed wire mesh composters have been constructed. For example, some framed wire mesh composters include doors for the removal of the fully composted material. Such structures still have several disadvantages, however. For example, they still fail to provide the ideal water/air balance, and as a class they do not accommodate easy mixing of the compost pile. Finally, because the composting material is quite visible there is still an aesthetics problem.

To address some of the problems associated with simple compost piles, compost pits and wire mesh bins, some individuals have used devices such as 55 gallon drums, with holes punched in the drum to permit the flow of air and water to the composting organic material. While such a device addresses many of the problems discussed above, it also does not allow for convenient mixing of the compost pile. The contents of the drum can be mixed to a degree by rolling the drum on the ground, or by rotating it in a stationary frame using a crank or the like. One problem with these mixing techniques is that very often the contents of the drum become so sticky that they simply clump into balls which skin over and resist composting. Thus it is felt that in order to get complete mixing and in order to achieve the most efficient composting conditions it is necessary to actually use a tool to turn over the composting material in the drum. A pitchfork or shovel could be used, through an open lid, but with great difficulty. To address this problem various "T" tools have been developed. The typical "T" tool has a handle, an elongated shaft and a pair of short tines at the lower end of the shaft. The "T" is formed at the bottom of the tool, by the tines and the shaft. Some "T" tools have pivoting tines, whereby when the working, or lower, end of the tool is inserted into the pile the tines fold inwardly toward the shaft; whereas when the tool is withdrawn the tines pivot outwardly, thereby forming a "T" shape at the bottom of the shaft, to pull at least some of the inner contents of the compost pile upwardly and outwardly, thereby turning the pile to a degree. As a class, such "T" tools aren't particularly effective, however. Organic composting materials are of such a consistency that they are not readily mixed simply by pulling up on the center of the pile with a small "T" shaped tool. In addition, pulling upwardly on such a "T" tool can be extremely awkward. Enclosed drums also do not take advantage of beneficial microbes and insects found in the soil. Finally, 55 gallon drum type composters are not particularly pleasing to the eye.

In an attempt to provide the ideal aerobic composting environment, as described above, and in an attempt to address some of the problems discussed above in connection with earlier aerobic composting techniques, some manufacturers have recently marketed slotted, box-like prefabricated composting bins, typically made of a molded plastic material, which can be assembled on site by the homeowner. One example of this type of bin is manufactured and sold by Barclay Mfg. Co. under the SoilSaver trademark. This type of compost bin includes slots or apertures which are intended to permit sufficient air flow to the compost pile while at the same time not permitting so much air flow that the compost pile becomes excessively dry. Such prefabricated compost bins also typically include some sort of lid to prevent excessive drying while at the same time shielding the compost pile from excessive rain and sunlight. Typically there is a lower door in the bin to permit removal of fully composted material.

While such prefabricated compost bins address many of the problems associated with earlier aerobic composting devices and techniques (e.g., simple compost piles, compost pits, etc.), such prefabricated bins still do not provide the ideal aerobic composting environment. For example, mixing the composting material is usually quite difficult, and such compost bins do not include means for metering the appropriate amount of rainwater to the pile. Mixing is typically accomplished by removing the lid and attempting to stir or turn the compost pile from the top using a shovel, pitchfork or "T" tool, as described above. As noted above, however, it is extremely difficult to effectively mix the entire contents of the pile by leaning over the upper edge of the bin and stirring the contents from the top. As to rainwater, typically the lids for such prefabricated bins include apertures, presumably to allow the flow of air and rainwater to the compost pile. But typically there are either not enough apertures or too many apertures to provide the proper balance of air and water to the compost pile. In addition, water/air apertures can admit excessive sunlight (thereby reducing, it is believed, the effectiveness of some of the microbes) and adversely impact the mechanical strength of the lid as well.

It should be noted that there are many other types of composters. The devices and techniques discussed above are representative of some of the more common types, but it should be understood that many other types of compost bins have been tried over the years.

The present invention is a method and apparatus for the aerobic composting of organic material, in particular lawn and garden waste such as grass clippings, leaves and twigs. The apparatus and method of the present invention provide the optimum aerobic composting environment and in particular meter in appropriate amounts of water, air and sunlight, and allow for easy mixing of the compost pile, so that the aerobic composting process can proceed at maximum efficiency.

SUMMARY OF THE INVENTION

Accordingly, one aspect of the present invention is a composting apparatus having L-shaped slots therein which permit complete aeration and mixing of the contents within the composter.

The composting apparatus can further include a tool suitable for insertion into the L-shaped slots, wherein the tool can be inserted into the slots substantially vertically and pivoted to a substantially horizontal position to achieve complete mixing of all of the compost material.

Broadly speaking, another aspect of the invention includes a method for composting comprising the following steps: selecting a compost bin having one or more substantially horizontal slots formed therein; selecting an elongate mixing tool which can be inserted into the slot(s); and selectively inserting the mixing tool into the slot(s) in a substantially vertical orientation and pivoting the tool against leverage points established at the bottom surfaces of the slots, to a substantially horizontal position, to achieve thorough mixing of the compost material.

Still another aspect of the present invention is a composter having a cover, the cover including a rain collection ramp which slopes downwardly to one or more rain slots, wherein the rain collection ramp collects rainwater and diverts the rainwater to the rain slot(s).

BRIEF DESCRIPTION OF THE DRAWING

The invention will be further described with reference to the appended Drawing, wherein.

DETAILED DESCRIPTION OF THE PREFERRED EMBODIMENT

Figure 1:
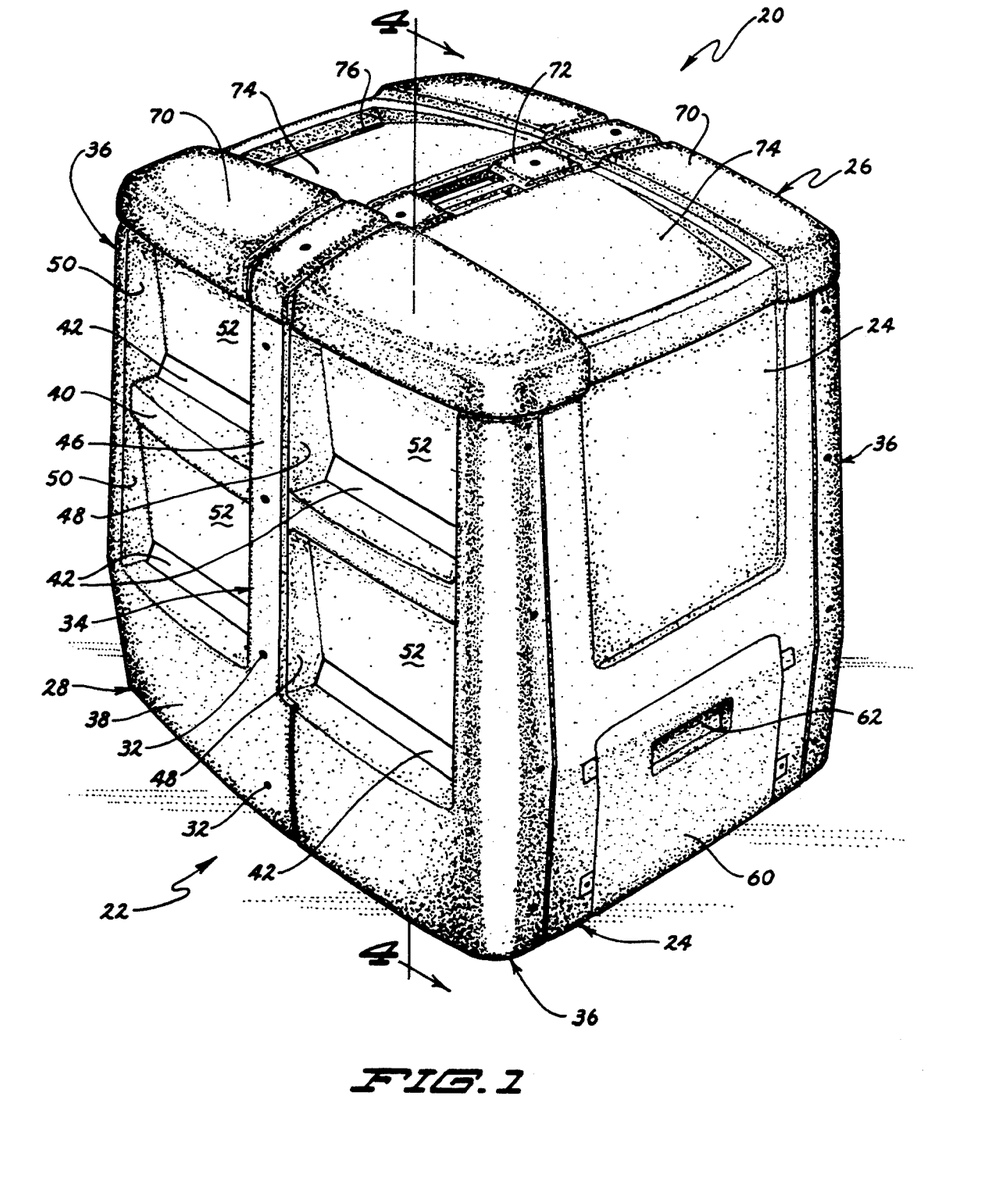
FIG. 1 is a perspective view of a preferred compost bin according to the present invention.

In the Drawing, wherein like reference numerals designate like parts and assemblies throughout the several views, FIG. 1 shows a perspective view of a preferred compost bin 20 according to the invention. Compost bin 20 is in the nature of a large rectangular box having a capacity of about 12.5 bushels or about ⅜ cubic yard. Bin 20 preferably includes a pair of opposed, substantially vertical, slotted panels 22; and a pair of opposed, substantially vertical, door panels 24. Slotted panels 22 are about 32 inches in height and about 37 inches in width, whereas door panels 24 are about 32 inches in height and about 24 inches in width. Slotted panels 22 and door panels 24 are joined together at their respective edges to form a substantially rectangular bin which is open at the bottom and covered at the top, through the use of a snug fitting cover 26.

Figure 2:
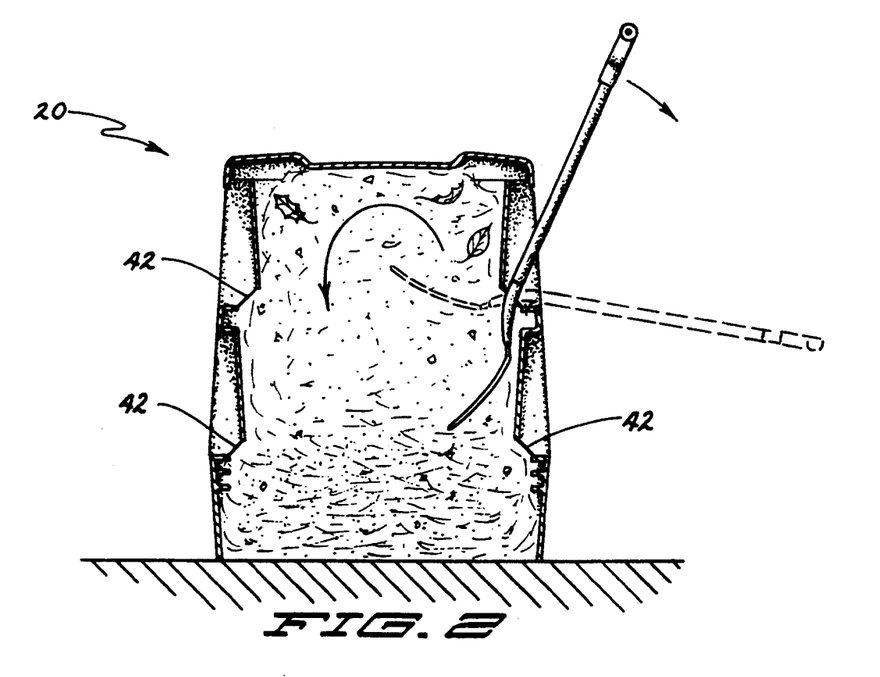
FIG. 2 is a side sectional view of the composter of FIG. 1, showing a pitchfork or garden fork being used to mix the compost pile through one of the top slots in the bin.
Figure 3:
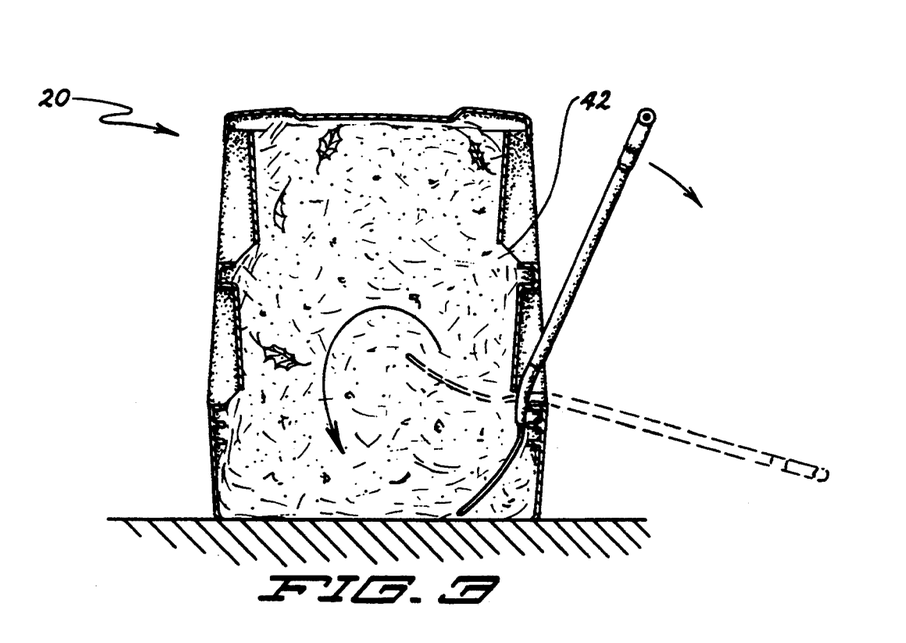
FIG. 3 is a side sectional view of the composter of FIG. 1, showing a pitchfork or garden fork being used to mix the compost pile through one of the bottom slots in the bin.
Figure 4:
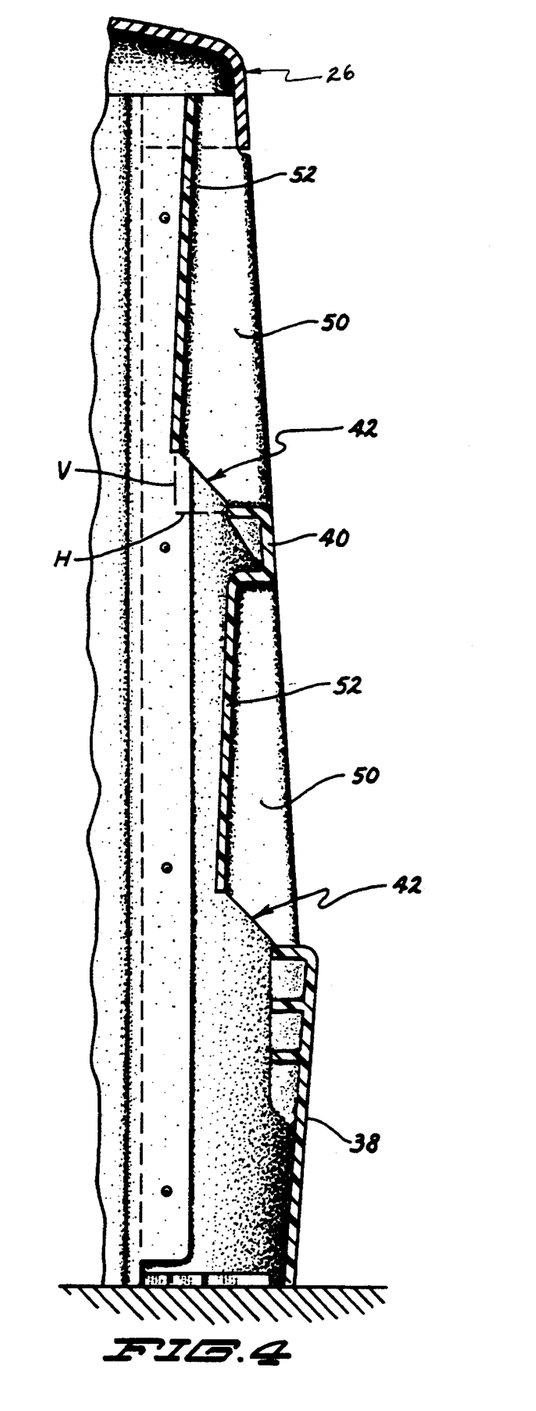
FIG. 4 is an enlarged side sectional view taken generally along line 4—4 of FIG. 1, showing in particular the top and bottom mixing/aeration slots.

Each slotted panel 22 includes a wider panel section 28 and a narrower panel section 30 which are overlapped and then connected together using threaded fasteners 32 to form the entire slotted panel 22. Each slotted panel 22 also includes a central column 34 and a pair of corner columns 36, wherein columns 34 and 36 extend upwardly from a substantially rectangular base member 38 located at the very bottom of the slotted panel 22. Base member 38 and spaced columns 34 and 36 combine to form a W-shaped structure. Spanning horizontally from the central column 34 to each of the corner columns 36, and spaced vertically above base member 38, is a cross member 40. Cross members 40 are located roughly mid way up slotted panel 22. Central column 34 and cross members 40, in combination, are about the same length and are perpendicular to one another such as to form a "+" shape, with four roughly square-shaped "quadrants" formed in the spaces between the columns 34, 36; cross members 40; and base member 38. Referring in particular to FIGS. 2, 3 and 4, each slotted panel 22 includes a plurality of horizontal, "L-shaped" aeration/mixing slots 42, with one mixing slot 42 toward the bottom of each square-shaped "quadrant." The rationale behind the configuration of the L-shaped slots 42 will be explained below.

The central column 34 of each slotted panel 22 includes an outer peripheral surface 46 and perpendicular thereto a pair of side, substantially vertical surfaces 48. Similarly, each corner column 36 includes a side surface 50, as well. Spanning between the side surfaces 48 and 50 are the cross members 40. Above and below each cross member 40 is a squarish sloped wall surface 52 (located in one of the roughly square-shaped "quadrants" formed by the "+" of the central column 34 and the cross members 40) which spans between the central column 34 and the corner columns 36 and engages the side surfaces 48 and 50 of the columns 34 and 36, respectively. Each wall surface 52 slopes inwardly and downwardly so as to produce, at its bottom edge, the horizontal "leg" of one of the "L" shaped slots 42. The vertical "leg" of each "L" shaped slot 42 is created by virtue of the fact that the sloped wall surface 52 does not vertically extend all the way down to the cross member 40 or base member 38, as the case may be. L-shaped slots 42 are preferably about 11½ inches wide, about 1½ inches high (the vertical leg), and about 1¼ inches deep (the horizontal leg) to accommodate a standard garden fork or potato fork, as further discussed below. FIG. 4 illustrates the vertical and horizontal "legs" of the L-shaped slots through the use of lines bearing the labels "V" and "H", respectively.

Referring to FIG. 4 in particular, it can be seen that the cross members 40 and base member 38 are configured as beams or channels so as to provide a sufficiently strong leveraging surface for the mixing tool. Specifically, each cross member 40 and the base member 38 includes a plurality of spaced horizontal surfaces or ribs joined by vertical web-like structures. This construction technique provides enhanced bending strength so that the leveraging surfaces created by cross members 40 and base member 38 do not deflect excessively as the compost pile is being mixed.

The preferred material for composter 20 is a black thermoplastic such as polypropylene or polyethylene. Use of a black plastic material helps retain heat and also raises the composting temperature through solar absorption. Also, it has been found that black plastic materials are more UV stable, more resistant to fading and less likely to become brittle over time. Preferably the composter is constructed using a structural foam injection molding process. Structural foam functions as a thermal insulator which helps hold the heat in the composter 20 and accelerates the decaying process. The material is nominally ¼ inch thick.

Composter 20 also includes a pair of opposed door walls 24, as discussed above. Door walls 24, in contrast to slotted walls 22, are not vented. Door walls 24 do, however, each include a door 60, which can easily be removed to allow for the removal of the finished compost. As shown in FIG. 1, each door 60 includes a hand grip 62 for use in removing the door 60 from the corresponding door wall 24.

Figure 8:
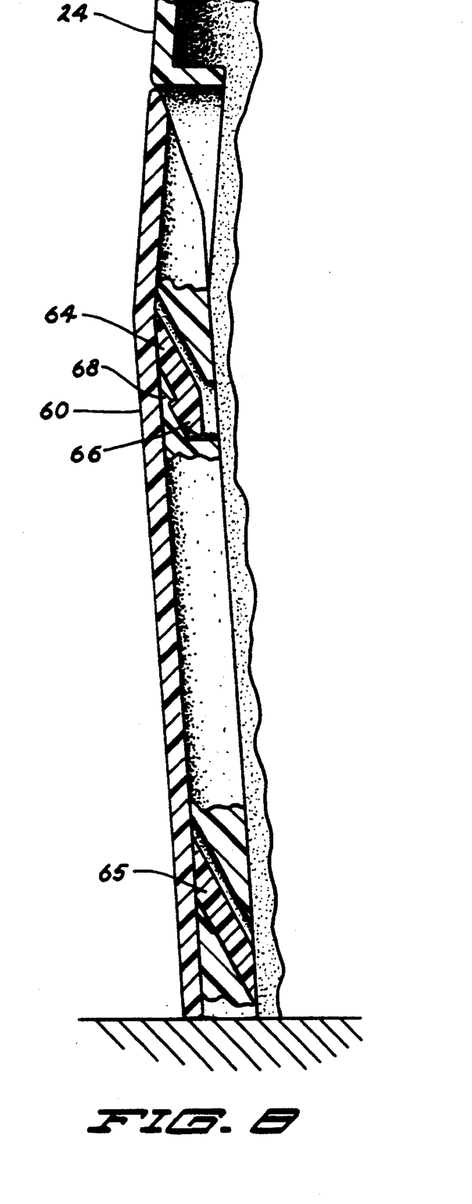
FIG. 8 is a partial, enlarged side sectional view of the door of the composter, taken generally along line 8—8 of FIG. 7.
Figure 9:
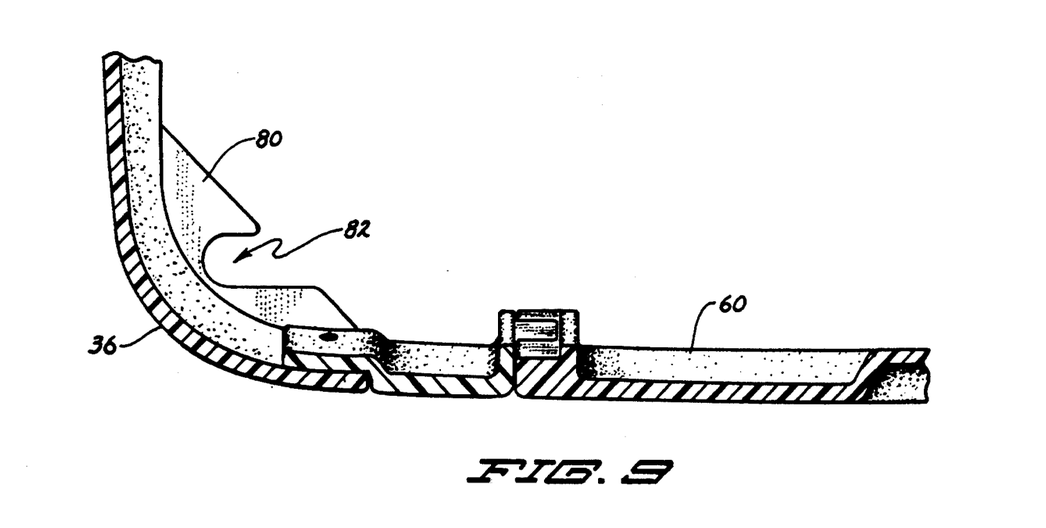
FIG. 9 is a sectional view of the composter of FIG. 1, taken generally along line 9—9 of FIG. 7.

FIG. 8 shows a sectional view of door 60 and door wall 24, showing the manner in which the door 60 is removably connected to the corresponding door wall 24. Each door 60 carries roughly at its corners four tabs, a pair of upper tabs 64 and a pair of lower tabs 65. Each upper tab 64 includes a downwardly facing barb 66 which snaps into an opposing, upwardly facing barb 68 formed on the lower surface of the corresponding door wall slot. In order to remove the door 60 from the door wall 24, it is simply necessary to push inwardly on the door 60 to disengage the barbs 66 and 68 from one another; at that point the hand grip 62 can be used to lift and remove the door 60 from the door wall 24. Tabs 65 are unbarbed and fit smoothly into corresponding slots formed in door wall 24. FIG. 9 also illustrates the manner in which door 60 is secured to door wall 24.

Figure 5:
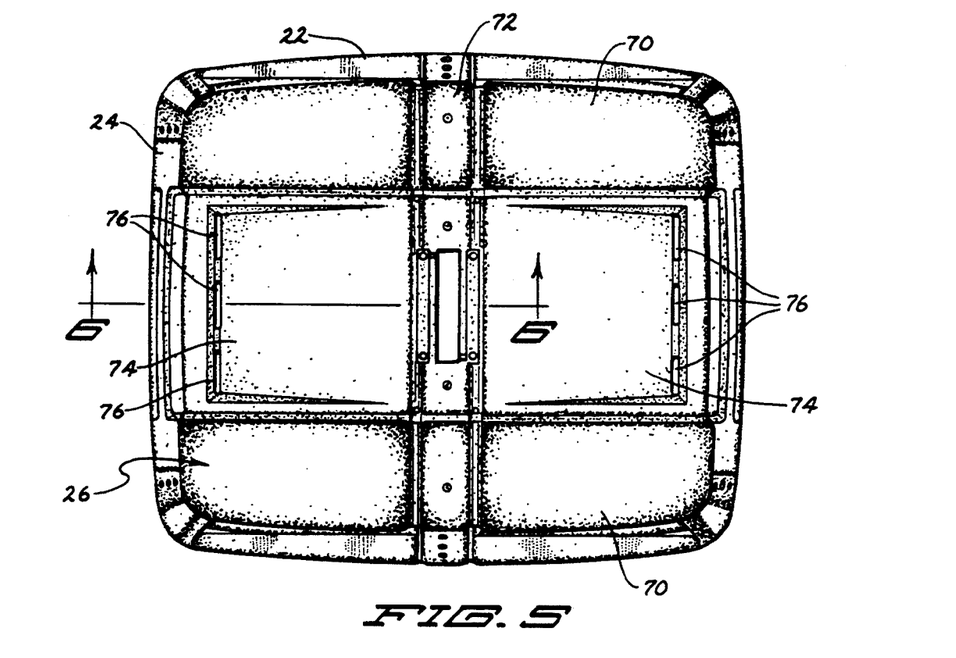
FIG. 5 is a top plan view of the cover for the compost bin of FIG. 1.
Figure 6:
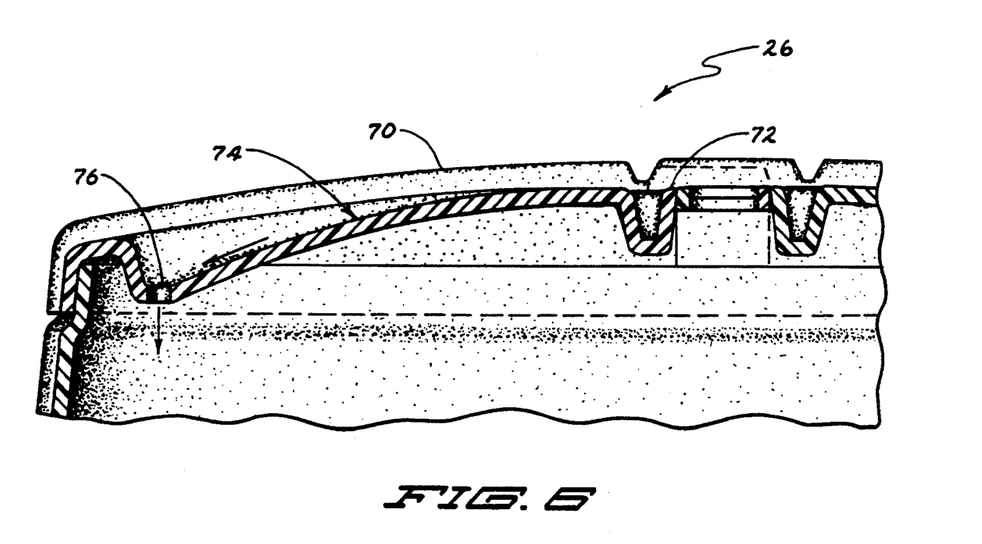
FIG. 6 is a partial side sectional view of the cover taken generally along line 6—6 of FIG. 5, showing in particular the rain slots and related structure.
Figure 7:
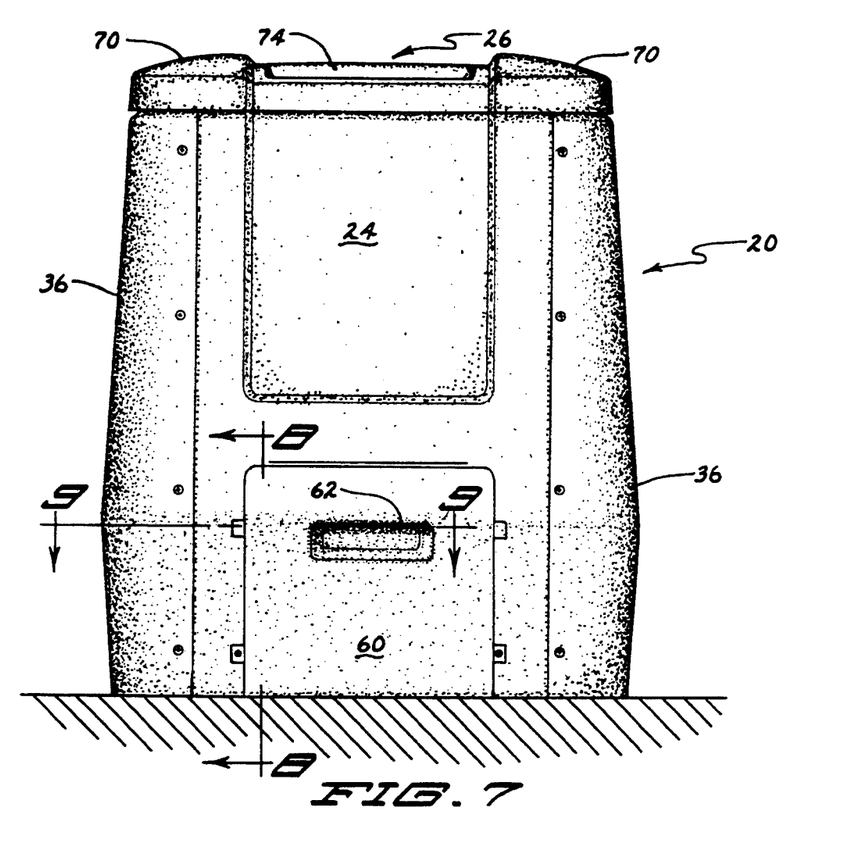
FIG. 7 is a side elevational view of the composter of FIG. 1, showing the door.

Cover 26 is substantially rectangular in plan view and includes on its longer edges a pair of elongate spaced ridge elements 70. Spanning centrally between the ridge elements 70 is a handle section 72, perpendicular to ridge elements 70, which is recessed slightly below the top surface of the ridge elements 70. Sloping downwardly and outwardly from the handle section 72 is a pair of rain collection ramps 74. At the bottom of each of the rain collection ramps is a plurality of rain slots 76. There are six rain slots with each rain slot being about 2.5 by 0.25 inches. The rain collection ramps 74 taper smoothly downwardly and outwardly from the central handle section 72 to the rain slots 76 such that rain water will be diverted through the rain slots and into the interior of the compost bin. The use of rain collection ramps and rain slots is in contrast to the typical prior art technique which included the use of a plurality of apertures covering a fairly large extent of the cover. This technique can admit excessive sunlight to the pile, however, and the large number of apertures reduce the strength of the cover as well.

Compost bin 20 is preferably open at the bottom so that earthworms and other insects can naturally assist in the composting process, and so that compost water or "sap" can simply seep into the ground rather than accumulate in the bottom of the bin. Referring to FIG. 9, flanges 80 with slots 82 are formed at the bottoms of the corner columns 36 so that the compost bin can be secured to the ground using small nails or spikes, for example, so as to reduce the possibility that the compost bin will be blown over by a stiff wind.

Referring to FIGS. 2 and 3, the mixing process for compost bin 20 is illustrated. Typically, the finished compost material, if any, would first be removed through one or both of the doors 60. Following that, the "unfinished" (not yet fully decayed) composting material would be mixed as shown in FIGS. 2 and 3. The top of the pile would typically be mixed first as shown in FIG. 2; the bottom would then be mixed as shown in FIG. 3. The value of the L-shaped slots 42 in the slotted walls 22 can now be fully appreciated. The horizontal leg "H" of each L-shaped slot 42 permits the substantially vertical insertion of the mixing tool (as shown in solid line in FIGS. 2 and 3), whereas the vertical leg "V" of each L-shaped slot 42 allows pivoting of the tool to a more or less horizontal position (as shown in dashed line in FIGS. 2 and 3). The problem with mixing grass clippings, leaves and other lawn and garden waste materials is that the compost pile as a whole wants to move when but a small part of the pile is moved. That is, an extreme "bridging" problem exists because of the structure of the leaves, grass clippings, etc. Thus, what is needed is a way to loft and mix the pile with minimal effort. The present invention permits such mixing using a standard garden fork or the like.

The importance of the beam or channel construction of the leverage points, for the mixing tool, can now be fully appreciated as well. When the tool is in its initial, roughly vertical orientation, the forces on the leverage points will have significant horizontal components; whereas when the tool approaches its final, roughly horizontal orientation, the forces on the leverage points will have significant vertical components. Thus it is believed that it is preferable to configure the leverage points such that they resist bending both in the horizontal and vertical directions; hence the vertical and horizontal sections in the beam/channel construction.

The mixing process as shown in FIGS. 2 and 3 is also important in that the entire compost pile can be mixed. If the mixing slots were only vertical in nature and did not have a horizontal aspect to them, then it would be extremely difficult, if not impossible, to insert the mixing tool vertically, or substantially vertically, as shown in solid line in FIGS. 2 and 3. If the tool cannot be inserted vertically there will be "dead spots" near the walls of the bin which cannot be reached and which are therefore not adequately mixed. On the other hand, if the mixing slots did not have a vertical component to them (the vertical "leg" of the preferred L-shaped slots), then it would be very difficult to pivot the mixing tool to the horizontal position as shown in dashed line in FIGS. 2 and 3. If the tool cannot be pivoted to the horizontal, or near horizontal position, then it is likely that the pile will not be completely turned and mixed, thus composting efficiency is sacrificed.

The rain metering system of the present invention is also important in that it permits controlled amounts of rain to enter the interior of the compost bin. Ramps 74 guide the rainwater down to the rain slots 76. The rain slots 76 in turn permit the water to enter the interior of the compost bin. One important advantage of this rain metering system is that the rain collection ramps 74 collect the rainwater and divert it to the rain slots 76 and it isn't necessary to include rain/air apertures over the entire surface of the cover which would tend to reduce the cover's strength and also admit, potentially, excessive sunlight (which, it is believed, reduces the effectiveness of some of the composting microbes). The relatively solid cover also helps retain heat and moisture in the composter, to accelerate the decaying process.

A preferred embodiment of the invention is described above. Those skilled in the art will recognize that many embodiments are possible within the scope of the invention. Variations and modifications of the various parts and assemblies can certainly be made and still fall within the scope of the invention. Thus, the invention is limited only to the apparatus and method recited in the following claims, and equivalents thereof.

We claim:

1. A composting apparatus for containing a composting material in such a way that the composting material can be turned and mixed by a mixing tool having a shaft thickness, the composting apparatus including at least one generally vertical side wall, wherein each side wall comprises:

(a) at least one generally planar wall surface inclined from the vertical such that the bottom edge of the wall surface is located inwardly relative to the top edge thereof; and (b) corresponding to each wall surface, a generally horizontal leveraging structure spaced outwardly and downwardly relative to the bottom edge of the wall surface, thereby creating a slot being sized and configured to permit substantially vertical insertion of the mixing tool and, supported by the leveraging structure, pivoting of the mixing tool to a substantially horizontal position to achieve a greater degree of articulation of the mixing tool and consequently enhanced lifting and mixing of the composting material.

2. The composting apparatus of claim 1, wherein each slot is sized and configured to accommodate a standard garden fork or potato fork.

3. The composting apparatus of claim 2, wherein the bottom edge of each wall surface is spaced upwardly and inwardly relative to the corresponding leveraging structure about 1½ inches and 1¼ inches, respectively.

4. The composting apparatus of claim 1, wherein each slot is about 11½ inches wide.

5. The composting apparatus of claim 1, wherein each leveraging structure comprises a plurality of spaced horizontal surfaces or ribs joined by vertical web-like structures, to provide enhanced bending strength so that the leveraging structures resist excessive deflection when serving as fulcrum points for the mixing tool as the composting material is being mixed thereby.

6. The composting apparatus of claim 1 further comprising a cover, wherein the cover includes a rain collection ramp which slopes downwardly to a rain slot, wherein the rain collection ramp collects rainwater and diverts the rainwater to the rain slot.

* * * * *